(12) United States Patent
Lee et al.

(10) Patent No.: US 9,148,859 B2
(45) Date of Patent: Sep. 29, 2015

(54) METHOD FOR TRANSMITTING IDC INTERFERENCE INFORMATION IN WIRELESS COMMUNICATION SYSTEM AND DEVICE THEREFOR

(75) Inventors: Jaewook Lee, Anyang-si (KR); Sungjun Park, Anyang-si (KR); Sunghoon Jung, Anyang-si (KR); Youngdae Lee, Anyang-si (KR); Seungjune Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 118 days.

(21) Appl. No.: 13/982,935

(22) PCT Filed: Apr. 18, 2012

(86) PCT No.: PCT/KR2012/002941
§ 371 (c)(1),
(2), (4) Date: Jul. 31, 2013

(87) PCT Pub. No.: WO2012/148119
PCT Pub. Date: Nov. 1, 2012

(65) Prior Publication Data
US 2013/0301537 A1    Nov. 14, 2013

Related U.S. Application Data (60) Provisional application No. 61/479,400, filed on Apr. 27, 2011, provisional application No. 61/480,384, filed on Apr. 29, 2011.

(51) Int. Cl.
*H04W 24/00* (2009.01)
*H04W 52/40* (2009.01)
(Continued)

(52) U.S. Cl.
CPC ............ *H04W 52/243* (2013.01); *H04W 24/10* (2013.01); *H04W 52/367* (2013.01); *H04W 88/06* (2013.01); *Y02B 60/50* (2013.01)

(58) Field of Classification Search
USPC ................ 370/252, 318; 455/67.13, 127.1
See application file for complete search history.

(56) References Cited

U.S. PATENT DOCUMENTS 8,830,934 B2 *    9/2014    Banister et al. ............... 370/329
2007/0281620 A1 * 12/2007    Rubin et al. ................. 455/63.1
(Continued)

FOREIGN PATENT DOCUMENTS

WO    2009089046 A2    7/2009
WO    2011044056 A2    4/2011

OTHER PUBLICATIONS

Media Tek, "Power Control Alternatives for IDC", 3GPP TSG-RAN WG2 Meeting #73-BIS, R2-112021, Apr. 11-15, 2011.
(Continued)

*Primary Examiner* — Andrew Lee
(74) *Attorney, Agent, or Firm* — Dentons US LLP (57) ABSTRACT

The present invention relates to a method for transmitting In-Device Coexistence (IDC) interference information to a base station from a first communication module of a terminal in a wireless communication system. More specifically, the method is characterized by comprising: calculating a value representing the reduction in transmission power of the first communication module for avoiding the effect of interference of at least one second communication module which coexists in the terminal; and transmitting IDC interference information that includes the calculated reduced power value to a base station, if the calculated reduced power value exceeds a threshold value.

14 Claims, 7 Drawing Sheets

(51) Int. Cl.
*H04W 52/24* (2009.01)
*H04W 24/10* (2009.01)
*H04W 88/06* (2009.01)
*H04W 52/36* (2009.01)

(56) References Cited

U.S. PATENT DOCUMENTS

| | | | |
|---|---|---|---|
| 2008/0188260 A1* | 8/2008 | Xiao et al. | 455/522 |
| 2011/0090982 A1* | 4/2011 | Chen et al. | 375/285 |
| 2011/0300805 A1* | 12/2011 | Gaikwad et al. | 455/63.1 |
| 2012/0009766 A1* | 1/2012 | Adam et al. | 438/479 |
| 2012/0176923 A1* | 7/2012 | Hsu et al. | 370/252 |
| 2012/0207040 A1* | 8/2012 | Comsa et al. | 370/252 |
| 2012/0214537 A1* | 8/2012 | Kim et al. | 455/522 |
| 2013/0301537 A1* | 11/2013 | Lee et al. | 370/328 |

OTHER PUBLICATIONS

Media Tek, "Analysis in In-Device Coexistence Intereference Avoidance", 3GPP TSG-RAN WG2 Meeting #71, R2-104444, Aug. 23-27, 2010.

* cited by examiner

(a) control plane protocol stack (b) user plane protocol stack

METHOD FOR TRANSMITTING IDC INTERFERENCE INFORMATION IN WIRELESS COMMUNICATION SYSTEM AND DEVICE THEREFOR

This Application is a 35 U.S.C. §371 National Stage Entry of International Application No. PCT/KR2012/002941, filed Apr. 18, 2012 and claims the benefit of U.S. Provisional Application Nos. 61/479,400, filed Apr. 27, 2011 and 61/480,384, filed Apr. 29, 2011, all of which are incorporated by reference in their entirety herein.

TECHNICAL FIELD

The present invention relates to a wireless communication system, and more particularly, to a method of transmitting In-Device Coexistence (IDC) interference information in a wireless communication system and an apparatus therefor.

BACKGROUND ART

3GPP LTE ($3^{rd}$ generation partnership project long term evolution) communication system is schematically explained as an example of a wireless communication system to which the present invention is applicable.

Figure 1:
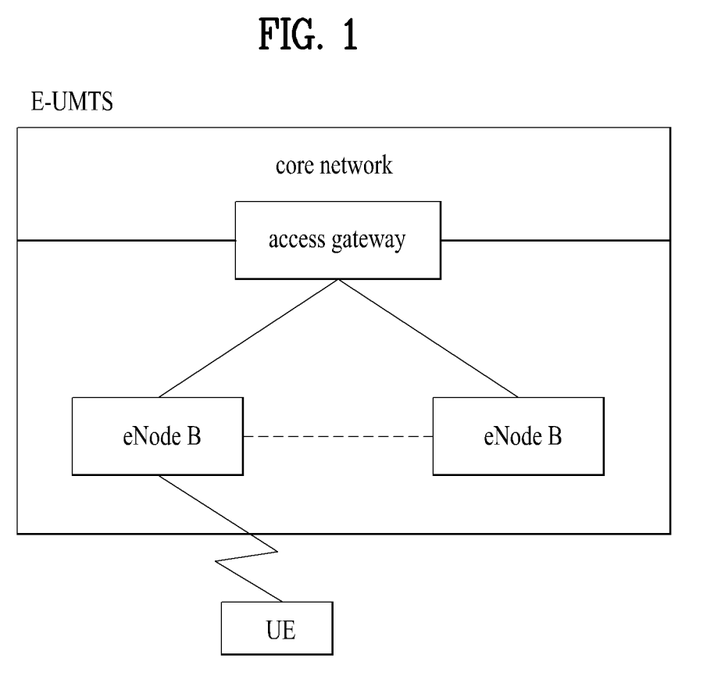
FIG. 1 is a schematic diagram of E-UMTS network structure as one example of a wireless communication system.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general.

Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, an object of the present invention is to provide a method of transmitting IDC interference information in a wireless communication system and apparatus therefore.

Technical Solution

To achieve these and other advantages and in accordance with the purpose of the present invention, as embodied and broadly described, according to one embodiment, a method of transmitting IDC (In-Device Coexistence) interference information, which is transmitted by a first communication module of a user equipment to an eNode B in a wireless communication system includes the steps of calculating a transmit power reduction value of the first communication module to avoid interference affecting one or more second communication modules coexisting in the user equipment and if the calculated power reduction value is greater than a threshold value, transmitting the IDC interference information containing the calculated power reduction value to the eNode B.

Or, if the calculated power reduction value is greater than the threshold value, the method can further include the step of reducing the transmit power of the first communication module as much as the threshold value. In this case, the IDC interference information includes a difference value between the calculated power reduction value and the threshold value.

Preferably, if the calculated power reduction value is less than the threshold value, the method further includes the step of reducing the transmit power of the first communication module as much as the calculated power reduction value.

More preferably, the threshold value may correspond to P-MPR (Power Management-Maximum Power Reduction) or a value configured from the eNode B. In case of a latter case, the method further includes the step of receiving information on the threshold value from the eNode B.

And, the IDC interference information may include information on an interfering frequency where the first communication module affects the one or more second communication modules.

Meanwhile, to further achieve these and other advantages and in accordance with the purpose of the present invention, according to a different embodiment, a user equipment in a wireless communication system includes a first communication module configured to transceive a signal with a first communication system and one or more second communication modules configured to transceive a signal with a different communication system, the first communication module configured to calculate a transmit power reduction value of the first communication module to avoid interference affecting the one or more second communication modules coexisting in the user equipment, if the calculated power reduction value is greater than a threshold value, the first communication module configured to transmit the IDC interference information containing the calculated power reduction value to the eNode B.

In the embodiments, the one or more second communication modules include at least one selected from the group consisting of a transceiving module for a WiFi system, a Bluetooth transceiving module, and a GPS (Global Positioning System) receiving module and the first communication module is in a state of RRC (Radio Resource Control) connected with the eNode B.

Advantageous Effects

According to the aforementioned embodiments of the present invention, a user equipment can efficiently transmit IDC interference information.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. And, the embodiments of the present invention are explained on the basis of a FDD scheme, which is exemplary only. The embodiment of the present invention can be applied to an H-FDD scheme or a TDD scheme in a manner of being easily modified.

Figure 2:
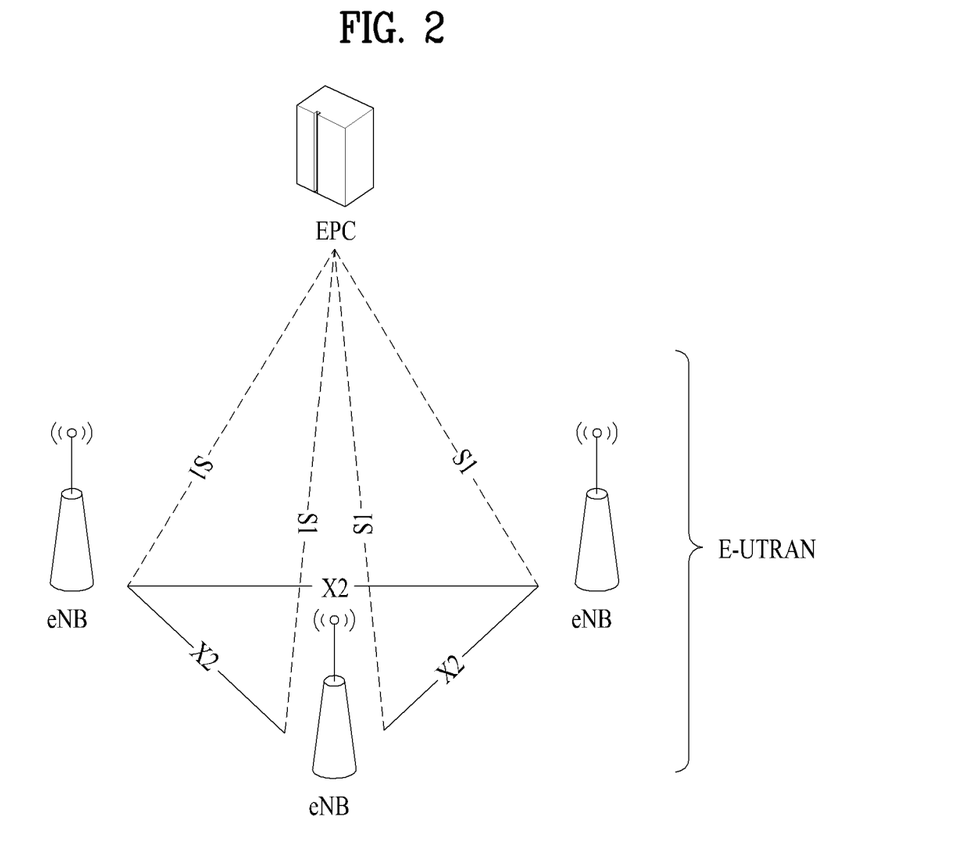
FIG. 2 is a conceptual diagram of E-UTRAN (evolved universal terrestrial radio access network) network structure.

FIG. 2 is a conceptual diagram of E-UTRAN (evolved universal terrestrial radio access network) network structure.

In particular, the E-UTRAN system is a system evolved from a conventional UTRAN system. The E-UTRAN consists of cells (eNBs) and the cells are connected to each other via X2 interface. A cell is connected to a user equipment via a radio interface and is connected to EPC (evolved packet core) through S1 interface.

The EPC includes MME (mobility management entity), S-GW (serving-gateway) and PDN-GW (packet data network-gateway). The MME has an access information of a user equipment or information on a capability of a user equipment. This information is mainly used for a mobility management of user equipment. The S-GW is a gateway having E-UTRAN as an end point. The PDN-GW is a gateway having PDN (packet data network) as an end point.

Figure 3:
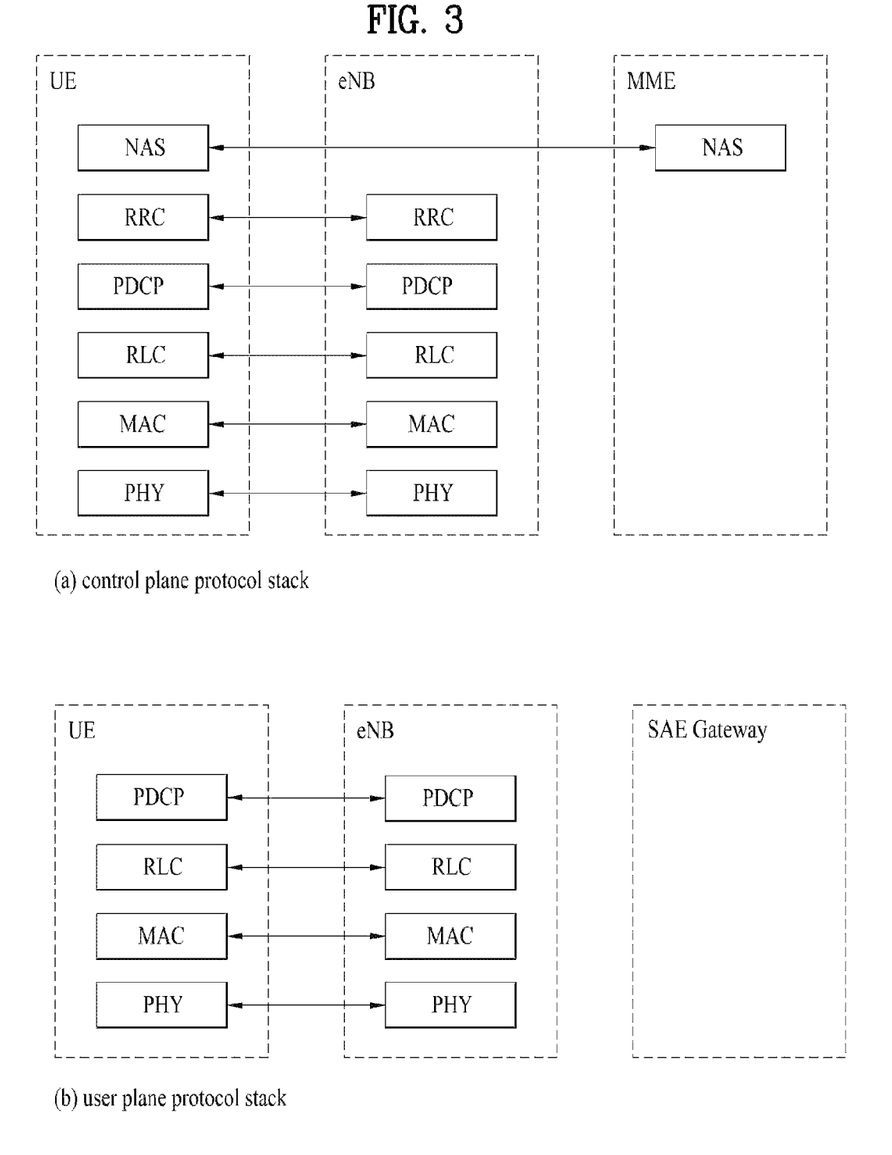
FIG. 3 is a diagram for structures of control and user planes of radio interface protocol between a 3GPP radio access network standard-based user equipment and E-UTRAN.

FIG. 3 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a first layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel).

Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

In the following description, an RRC state of a user equipment and an RRC connecting method are explained. First of all, the RRC state may indicate whether the RRC of the user equipment is logically connected to the RRC of the E-UTRAN. If the RRCs are logically connected together, such a state can be named 'RC_CONNECTED state'. Otherwise, such a state can be named 'RRC_IDLE state'.

Since E-UTRAN is able to recognize an existence of user equipment in the RRC_CONNECTED state by cell unit, the E-UTRAN is able to effectively control the corresponding user equipment. On the other hand, the E-UTRAN is unable to recognize the user equipment in the RRC_IDLE state by the cell unit. Hence, core network (CN) may manage the user equipment in the RRC_IDLE state by tracking area (TA) unit, which is a unit of area larger than a cell. Therefore, in order for the user equipment in RRC_IDLE state to receive such a service as voice or a data from the cell, the corresponding user equipment should make a transition to an RRC_CONNECTED state.

When a user initially turns on a power of a user equipment, the user equipment searches for an appropriate cell and then stays in RRC_IDLE state in the found cell. If the user equipment staying in the RRC_IDLE state needs to establish an RRC connection, the user equipment establishes the RRC connection with an RRC of E-UTRAN and then makes a transition to RRC_CONNECTED state. In this case, a case of establishing an RRC connection may include a case that an uplink data transmission is required due to such a reason as a user's call attempt and the like, a case that a response message needs to be sent in response to a reception of a paging message from the E-UTRAN, and the like.

In the following description, measurement and a measurement reporting are explained.

In the following description, a terminology of 'measurement' may be defined as to measure a quality value of a corresponding cell by receiving a reference signal received from cells situated at an inter-frequency, an intra-frequency, and an inter-RAT according to a measurement configuration received from a network by a user equipment. And, a terminology of 'quality' means to indicate the signal quality or the cell quality identified by the reference signal received from a measurement target cell in the following description.

In relation to a mobility of a user equipment in a mobile communication system, the user equipment measures quality of a serving cell currently providing a service and the quality of a neighbor cell consistently or on at least every discontinuous reception (DRX) period. The user equipment reports a measurement result for cell quality to a network in an appropriate time and the network provides the user equipment with optimum mobility via a handover and the like.

The user equipment performs a measurement of a specific purpose configured by the network to provide information for helping service providers manage the network besides the purpose of mobility support and may be able to report the cell quality measurement result to the network. For instance, the user equipment receives broadcast information of a specific cell designated by the network. The user equipment is able to report a cell identifier (cell identity), i.e., a global cell identifier of the specific cell, a location identification information (e.g., tracking area code) that the specific cell belongs and/or other cell information (e.g., whether the specific cell is a member of CSG (closed subscriber group) cell) to the serving cell.

When a user equipment in a moving state checks that the quality of a specific area is very poor by performing a measurement, the user equipment is able to report the location information on the cells having poor quality and the cell quality measurement result to a network. The network is able to make an attempt on a network optimization based on the reports of the cell quality measurement result of the user equipments, which help to operate the network.

In a mobile communication system that a frequency reuse factor is '1', mobility is mostly obtained between cells different from each other situated in an identical frequency band. Hence, in order to well secure the mobility of the user equipment, the user equipment should be able to appropriately measure quality and cell information of neighbor cells having a center frequency identical to that of a serving cell. As mentioned in the above, the measurement for the cell having a center frequency same with that of the serving cell is called an intra-frequency measurement. The user equipment makes the purpose of a corresponding cell quality measurement result accomplished in a manner of performing the intra-frequency measurement and then reporting the cell quality measurement result to a network on an appropriate timing.

A mobile communication service provider may be able to operate a network using a plurality of frequency bands. When a service of a communication system is provided using a plurality of the frequency bands, in order to secure an optimized mobility for a user equipment, the user equipment should be able to appropriately measure the quality and cell information of neighbor cells having a center frequency different from that of a serving cell. As mentioned in the above, the measurement for the cell having a center frequency different from that of the serving cell is called an inter-frequency measurement. The user equipment should be able to report the cell quality measurement result to the network on an appropriate timing by performing the inter-frequency measurement.

In case that the user equipment supports a measurement for a heterogeneous network, the user equipment may be able to measure a cell of the heterogeneous network by an eNode B configuration. The measurement for the heterogeneous network is called an inter-RAT (radio access technology) measurement. For instance, a RAT may include UTRAN (UMTS terrestrial radio access network) compliant with 3GPP standard, GERAN (GSM EDGE radio access network), and CDMA 2000 system compliant with 3GPP2 standard.

First of all, a method of controlling power of a user equipment, which is controlled by an eNode B according to a prior art is explained. In LTE system, power (dBm) necessary for a user equipment to transmit a UL physical shared channel can be determined by Formula 1 as follows.

$$P_{PUSCH}(i) = \min\{P_{CMAX}, 10 \log_{10}(M_{PUSCH}(i)) + P_{O\_PUSCH}(j) + \alpha(j) \cdot PL + \Delta_{TF}(i) + f(i)\} \quad \text{[Formula 1]}$$

In Formula 1, $M_{PUSCH}(i)$ is a PUSCH bandwidth assigned to a subframe of index i and represented by a resource block number unit. $P_{O\_H}(i)$ and $f(i)$ are values signaled from an upper layer. And, $\Delta_{TF}(i)$ is $\Delta_{TF}(i) = 10 \log_{10}((2^{MPR \cdot K_X} - 1)$ ($\beta_{offset}^{PUSCH}$) in case that $K_S$ is 1.25. If $K_S$ is 0, $\Delta_{TF}(i)$ is 0. And, the $K_S$ is a UE-specific parameter signaled by an upper layer.

And, the power necessary for a user equipment to transmit a UL physical control channel and a sounding reference signal can be determined by Formula 2 and Formula 3 as follow.

$$P_{PUCCH}(i) = \min\{P_{CMAX}, P_{O\_PUCCH} + PL + h(n_{CQI}, n_{HARQ}) + \Delta_{F\_PUCCH}(F) + g(i)\} \quad \text{[Formula 2]}$$

$$P_{SRS}(i) = \min\{P_{CMAX}, P_{SRS\_OFFSET} + 10\log_{10}(M_{SRS}) + P_{O\_PUCCH}(F) + g(i)\} \quad \text{[Formula 3]}$$

In this case, $P_{CMAX}$ means maximum power (actual maximum transmit power) capable of being transmitted by a user equipment in a corresponding cell and can be simply represented by Formula 4 as follows.

$$P_{cmax} = \min(P_{emax}, P_{umax}) \quad \text{[Formula 4]}$$

In this case, $P_{emax}$ means maximum power capable of being used by a user equipment in a corresponding cell signaled by an eNode B. And, $P_{umax}$ indicates the power considering a maximum power reduction (hereinafter abbreviated MPR), additional MPR (hereinafter abbreviated A-MPR), and the like to maximum transmit power ($P_{PowerClass}$) of the user equipment itself. In a current LTE system, the maximum transmit power ($P_{PowerClass}$) of the user equipment itself is defined as a Power Class 3 and it means the power of 23 dBm. Meanwhile, the MPR is a power reduction for the maximum transmit power, which is defined for a specific modulation order or numbers of resource block, to satisfy an RF requirements (spectrum emission mask (SEM), adjacent channel leakage ratio (ACLR), and the like) defined in a standard. The A-MPR means a power reduction for the maximum transmit power, which is defined due to a regional characteristic.

In particular, in the current 3GPP LTE standard, in case that an eNode B signals a network signaling (hereinafter abbreviated NS) value according to the characteristic of each country or region, the A-MPR value corresponding to a corresponding NS is defined. A protocol standard of a current LTE system defines an information element (hereinafter abbreviated IE) called AdditionalSpectrumEmission. The IE is configured to include 32 NSs in the IE. The A-MPR value corresponding to each NS is defined by 3GPP standard document TS36.101 and the A-MPR value is defined as Table 1 in Release 8.

In the 3GPP LTE standard, Master Information Block (MIB) and System Information Block (SIB) including information on a corresponding cell are broadcasted to the cell via such a physical channel as PBCH, PDSCH, and the like. The SIB can be divided into various types. Power of the user equipment and NS-related information are transmitted via an SIB type 1 and an SIB type 2.

The SIB type 1 signals the maximum power ($P_{emax}$) of the user equipment capable of being used in a corresponding cell via such a field as p-max. The SIB type 2 is configured to make the A-MPR to be recognized to the user equipments existing in a corresponding cell in a manner of signaling an NS value suitable for the corresponding cell via such a field as 'additionalSpectrumEmission'.

Meanwhile, a user equipment after a recent 3GPP standard document release 10 can perform an additional power backoff to simultaneously transmit signals using a different radio communication technology together with LTE. In particular, the user equipment can reduce UL transmit power within a range of a determined threshold value (power management-MPR (P-MPR) without informing an eNode B.

In the following description, IDC (In-Device Coexistence) and IDC interference are explained.

In order for a user to access various networks anywhere and at any time, it is necessary for a user equipment to be equipped with a GNSS (Global Navigation Satellite System) receiver as well as a transceiver for such a wireless communication system as LTE, WiFi, Bluetooth (BT), and the like. As mentioned in the foregoing description, wireless communication systems different from each other coexisting in a single user equipment is called IDC (In-Device Coexistence). Examples of the IDC may include a user equipment equipped with LTE and BT module to receive a VoIP service and a multimedia service using a BT earphones, a user equipment equipped with LTE and WiFi module to disperse a traffic, a user equipment equipped with GNSS and LTE module to additionally obtain a location information, and the like.

Figure 4:
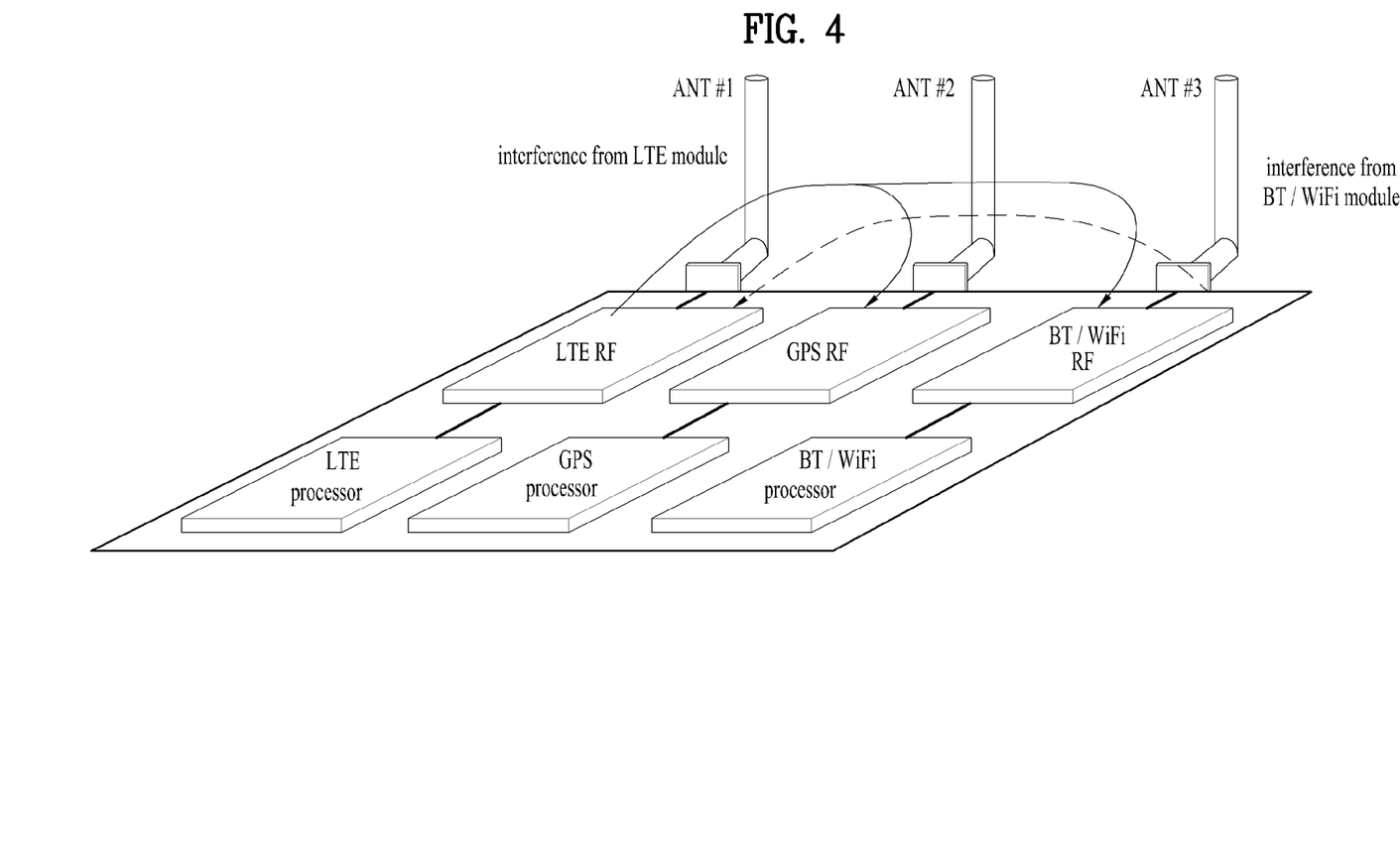
FIG. 4 is an example of an user equipment including radio communication modules for an LTE system, a GPS (Global Positioning System), and a BT/WiFi system, respectively.

FIG. 4 is an example of a user equipment including radio communication modules for an LTE system, a GPS (Global Positioning System), and a BT/WiFi system, respectively.

Referring to FIG. 4, in case of the aforementioned user equipment, since many transceivers are close to each other in one user equipment, power of a signal transmitted from a transmitter may be higher than the power of a signal received by a different receiver. In this case, interference can occur between different communication modules and this is called IDC interference. In case that the IDC interference becomes severe, a ping-pong phenomenon, continuously attempting a handover, may occur although there exists no problem in connecting to an eNode B.

TABLE 1

| Network Signalling value | Requirements (sub-clause) | E-UTRA Band | Channel bandwidth (MHz) | Resources Blocks | A-MPR (dB) |
|---|---|---|---|---|---|
| NS_01 | NA | NA | NA | NA | NA |
| NS_03 | 6.6.2.2.1 | 2, 4, 10, 35, 36 | 3 | >5 | ≤1 |
|  | 6.6.2.2.1 | 2, 4, 10, 35, 36 | 5 | >6 | ≤1 |
|  | 6.6.2.2.1 | 2, 4, 10, 35, 36 | 10 | >6 | ≤1 |
|  | 6.6.2.2.1 | 2, 4, 10, 35, 36 | 15 | >8 | ≤1 |
|  | 6.6.2.2.1 | 2, 4, 10, 35, 36 | 20 | >10 | ≤1 |
| NS_04 | 6.6.2.2.2 | TBD | TBD | TBD |  |
| NS_05 | 6.3.3.3.1 | 1 | 10, 15, 20 | ≥50 for QPSK | ≤1 |
| NS_06 | 6.6.2.2.3 | 12, 13, 14, 17 | 1.4, 3, 5, 10 | n/a | n/a |
| NS_07 | 6.6.2.2.3 6.6.3.3.2 | 13 | 10 | Table 6.2.4-2 | Table 6.2.4-2 |
| ... |  |  |  |  |  |
| NS_32 | — | — | — | — | — |

In general, the aforementioned communication modules may give interference to each other in a manner of operating in an adjacent frequency in terms of a frequency as follows.

The LTE module operates in a TDD Band 40 (2300 MHz ~2400 MHz) and the WiFi module or the Bluetooth module may operate in 2400 MHz ~2483.5 MHz, which an unlicensed band. In this case, the LTE module may interfere in the WiFi module or the Bluetooth module. Transmission from the WiFi module or the Bluetooth module may interfere in a reception of the LTE module.

And, The LTE module performs an uplink transmission in a FDD Band 7 (2500 MHz ~2700 MHz) and the Bluetooth module may operate in 2400 MHz ~2483.5 MHz, which an unlicensed band. In this case, the uplink transmission from the LTE module may interfere in the reception of the WiFi module or the Bluetooth module.

And, The LTE module operates in a FDD Band 13 (UL: 777-787 MHz, DL: 746-756 MHz) or a FDD Band 14 (UL: 788-798 MHz, DL: 758-768 MHz) and the GPS module may be able to receive a location information in 1575.42 MHz. In this case, an uplink transmission from the LTE module may interfere in the reception of the location information of the GPS module.

As one solution for the problems, occurrence of IDC interference between two transceivers can be avoided by sufficiently securing a space between physical filters or in a frequency between each transmitting and receiving signal. Yet, in case that many wireless communication modules operate in an adjacent frequency, it is hardly expected that a current filter technology is able to sufficiently suppress the interference.

Aside from a method of applying a physical filter scheme, IDC interference avoidance scheme can be considered for 3 cases as follows according to whether there exists coordination between the LTE module and other communication modules coexisting with the LTE module and whether there exists coordination between the LTE module and an eNode B to eliminate the IDC interference.

A first case is a case that there is no coordination to avoid the IDC interference between communication modules coexisting in one user equipment and between the LTE module and the eNode B. In this case, the LTE module does not know the information on other communication modules coexisting with the LTE module.

A second case is a case that there exists coordination between the communication modules coexisting inside of the user equipment only. In this case, it may be able to know an operation state (i.e., ON/OFF state) between the modules coexisting in the user equipment, traffic transmission state, and the like.

A third case is a case that there exists coordination between the user equipment and the eNode B as well as between the modules coexisting inside of the user equipment. The LTE module may be able to measure the IDC interference by measuring inter/intra frequency as well as coordinating with other modules.

Currently, 3GPP considers 1) a method of changing a frequency by an interfering communication module or an interfered communication module (Frequency Division Multiplexing; FDM), 2) a method of using one frequency by coexisting communication modules in a manner of dividing time (Time Division Multiplexing; TDM), and 3) a method of reducing interference affecting coexisting modules in a manner of controlling a transmit power by the LTE module (LTE power control; LTE PC) to solve the IDC interference. Detail methods and procedures are currently under discussion by 3GPP.

In order for the aforementioned IDC interference control method to efficiently operate, cooperation of a network is necessary. In particular, in order to avoid the IDC interference, such a cooperation as a handover moving a currently using frequency to a different frequency, a scheduling of an eNode B to use a time resource in a manner of dividing the time resource, and the like are necessary. Since the IDC interference is a problem occurred in one user equipment, it is difficult for an eNode B to know the IDC interference. Hence, in case of occurrence of the IDC interference or in case of existing a possibility of occurrence of the IDC interference, the user equipment transmits the IDC interference information to the eNode B. And, in case that the IDC interference perished, the user equipment should transmit the IDC interference information to the eNode B as well.

Yet, in case that occurrence and perishing of the IDC interference consistently occur, since the user equipment should transmit all information related to the IDC interference to the eNode B, this may become a signal overhead.

In order to solve the aforementioned problem, a method of reducing interference, which affects other coexisting modules, in a manner of controlling a transmit power by the LTE module is mainly discussed in the present invention. In particular, in order to avoid the IDC interference, first of all, the LTE module calculates quantity of uplink power, which should be controlled (i.e., reduced). In case that the quantity of uplink power required to be reduced deviates a threshold value, the present invention proposes a scheme to transmit the IDC interference information to the eNode B. And, according to the present invention, in case that the quantity of uplink transmit power control, which is necessary to control the IDC interference affecting other communication modules, is less than a prescribed range, the LTE module may be able to lower the uplink transmit power by itself.

The IDC interference corresponds to a case that interference occurs in a reception of other communication modules due to the uplink transmission of the LTE module. Whether the IDC interference affecting other communication modules is started and the extent of the interference can be identified by the LTE module via an internal coordination of the user equipment.

Meanwhile, the LTE module may be able to perform a power control by the following two kinds of methods. 1) If the quantity of power needed to be controlled is less than a threshold value, the user equipment controls an uplink transmit power by itself. 2) If the quantity of power needed to be controlled is greater than a threshold value, the user equipment controls the uplink transmit power as much as the threshold value and may be then able to transmit the IDC interference information. Or, it may be able to implement the LTE module to directly transmit the IDC interference information without controlling the uplink transmit power.

And, the threshold value can be configured by an eNode B via a UE-specific signaling. For instance, the eNode B may be able to signal by using a parameter 'dl-PathlossChange', which is the parameter used for triggering a legacy Power Headroom Reporting (PHR), or by defining a new value for an IDC situation. Or, it may be able to consider a method of steadily using the value defined by 3GPP standard document as the threshold value as well. For instance, the aforementioned P-MPR value can be used for the threshold value to transmit the IDC interference information.

And, the IDC interference information may be able to include the information on the quantity of uplink transmit power needed to be controlled or the information on the quantity of uplink transmit power needed to be additionally controlled in a manner of reducing after controlling the uplink transmit power to the threshold value. Moreover, it is preferable that the IDC interference information includes the information on which modules are coexisting with the LTE module as well.

More preferably, the IDC interference information may be able to include the information to avoid IDC interference in a manner of not a power control but a FDM/TDM scheme together with the information on the quantity of uplink transmit power to be controlled or individually. This is helpful information in case that the IDC interference needs to be avoided with a different scheme since it is impossible to perform a power control above the threshold value. For instance, the IDC interference information may include unusable frequency information necessary for the FDM scheme. And, the IDC interference information may be able to include pattern information of an interfering subframe or an interfered subframe necessary for the TDM scheme and subframe pattern information and the like necessary for a user equipment to avoid the IDC interference.

In the following description, the present invention is explained in more detail with reference to drawings.

Figure 5:
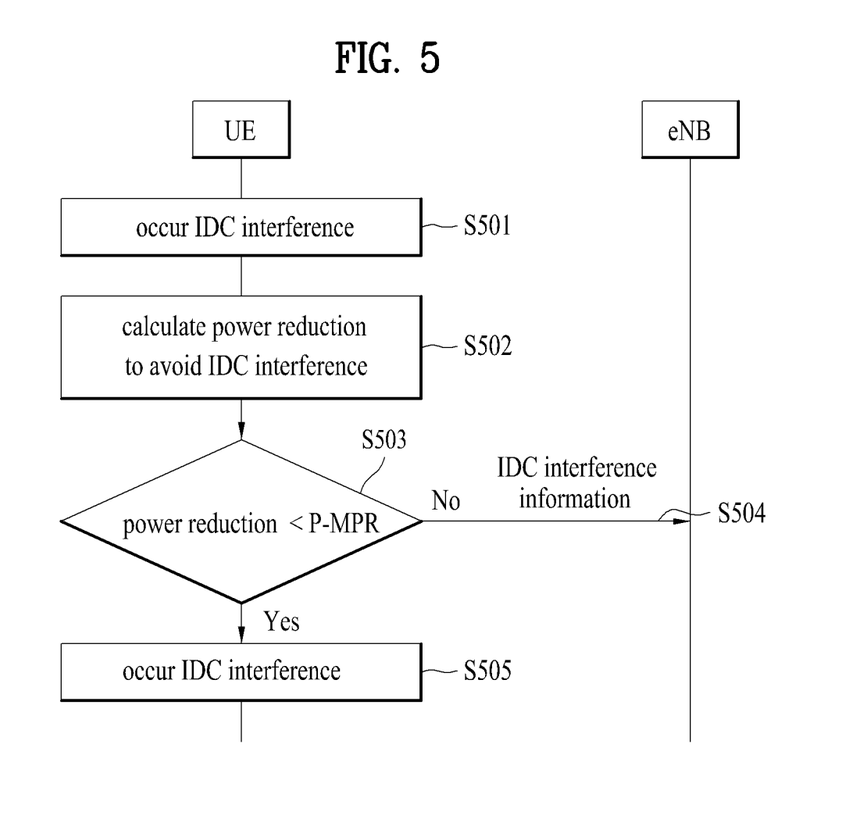
FIG. 5 is a flowchart of an example of transmitting IDC interference information to an eNode B according to embodiment of the present invention.

FIG. 5 is a flowchart of an example of transmitting IDC interference information to an eNode B according to embodiment of the present invention. In particular, FIG. 5 assume a case that P-MPR is used as a threshold value and an LTE module can evaluate the extent of interference affecting a different communication module coexisting via an internal coordination with the different communication module.

Referring to FIG. 5, an LTE module of a user equipment identifies an occurrence of IDC interference occurred in a different communication module coexisting due to a transmission of the LTE module via an internal coordination in the step S501. And, the LTE module of the user equipment calculates UL transmit power reduction necessary to avoid the IDC interference affecting the different communication module in the step S502.

Subsequently, the LTE module of the user equipment judges whether the calculated transmit power reduction is less than the P-MPR in the step S503. If it is necessary the transmit power reduction greater than the P-MPR, the LTE module directly transmits IDC interference information to an eNode B without adjusting the UL transmit power in the step S504. In this case, the IDC interference information can include the quantity of UL transmit power to be adjusted, subframe pattern information necessary for applying the TDM scheme, and information on the coexisting different communication module as well as the unusable frequency information. Or, after preferentially adjusting the UL transmit power as much as the P-MPR, the LTE module can additionally include necessary quantity of the UL transmit power in the IDC interference information.

Meanwhile, if the transmit power reduction is less than the P-MPR, the LTE module reduces the UL transmit power as much as it needs by itself in the step S505 without informing the eNode B.

Figure 6:
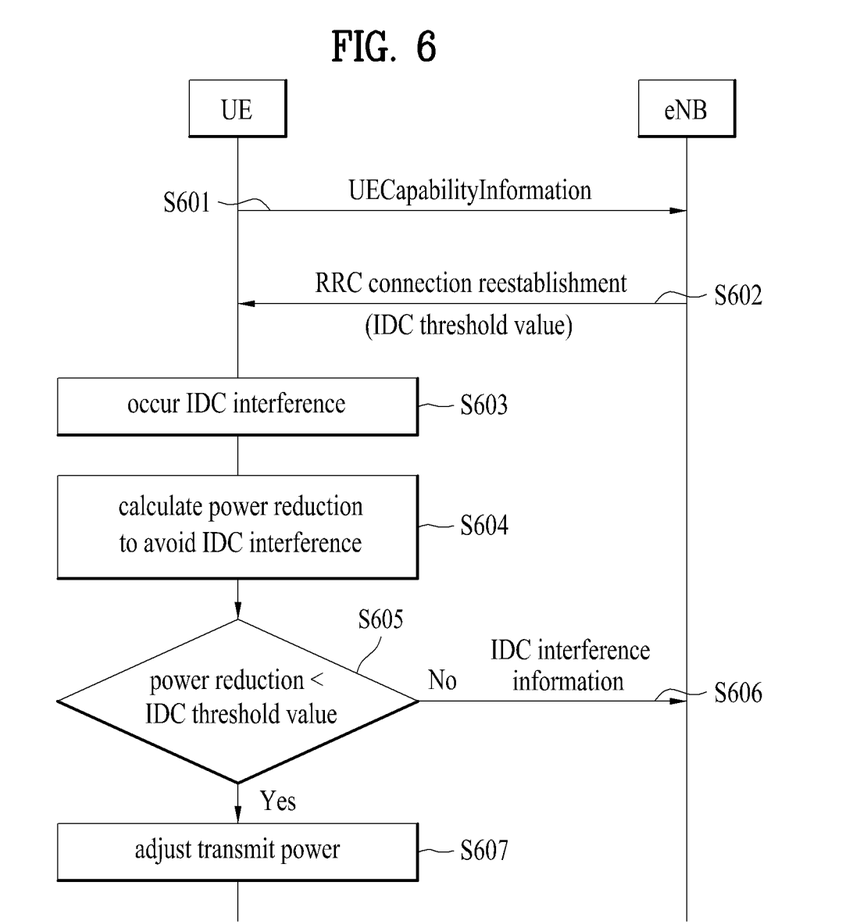
FIG. 6 is a flowchart of a different example of transmitting IDC interference information to an eNode B according to embodiment of the present invention.

FIG. 6 is a flowchart of a different example of transmitting IDC interference information to an eNode B according to embodiment of the present invention. In particular, FIG. 6 assumes that the user equipment receives a threshold value from the eNode B via an RRC message.

Referring to FIG. 6, the LTE module of the user equipment informs the eNode B that a different module except the LTE module is coexisting via UECapabilityInformation message in the step S601. In particular, the information to inform that the different module is coexisting can be informed in a manner of being defined as an IDC indication capability field in the UECapabilityInformation message. For reference, the IDC indication capability field can be configured with 1 bit size. In case that the different module except the LTE module is coexisting, the IDC indication capability field may have a value of 1. Otherwise, the IDC indication capability field may have a value of 0.

Having received the UECapabilityInformation message, the eNode B can transmit information on when the LTE module feedbacks the IDC interference information, i.e., the information on an IDC threshold value. The LTE module can adjust the UL transmit power without informing the eNode B as much as the threshold value. In particular, it can be considered that the LTE module performs a function similar to the P-MPR in FIG. 5. In FIG. 6, it is assumed that the eNode B transmits information on the IDC threshold value to the user equipment via an RRC connection reestablishment message.

Subsequently, the LTE module of the user equipment identifies an occurrence of IDC interference occurred in a different communication module coexisting due to a transmission of the LTE module via an internal coordination in the step S603. And, the LTE module of the user equipment calculates UL transmit power reduction necessary to avoid the IDC interference affecting the different communication module in the step S604.

Subsequently, the LTE module of the user equipment judges whether the calculated transmit power reduction is less than the IDC threshold value in the step S605. If it is necessary the transmit power reduction greater than the IDC threshold value, the LTE module directly transmits IDC interference information to the eNode B without adjusting the UL transmit power in the step S606. In this case, the IDC interference information can include the quantity of UL transmit power to be adjusted, subframe pattern information necessary for applying the TDM scheme, and information on the coexisting different communication module as well as the unusable frequency information. Or, after preferentially adjusting the UL transmit power as much as the IDC threshold value, the LTE module can additionally include necessary quantity of the UL transmit power in the IDC interference information.

Meanwhile, if the transmit power reduction is less than the IDC threshold value, the LTE module reduces the UL transmit power as much as it needs by itself in the step S607 without informing the eNode B.

In summary, if the LTE module in the RRC_CONNECTED state identifies that the different module coexisting in the user equipment is affected by interference due to an UL transmission of the LTE module, the LTE module can inform a situation of interference occurrence in a timely fashion in a manner of reducing the interference affecting the different communication module by adjusting the UL transmit power as much as the threshold value according to the present invention.

And, since the LTE module informs the IDC interference situation when an actual IDC interference occurs, it is able to prevent the LTE module from transmitting unnecessary IDC interference information when the actual IDC interference does not occur. And, the eNode B can trust the IDC interference information transmitted by the user equipment via an operation of transmitting the IDC interference information, which is common for all user equipments.

Figure 7:
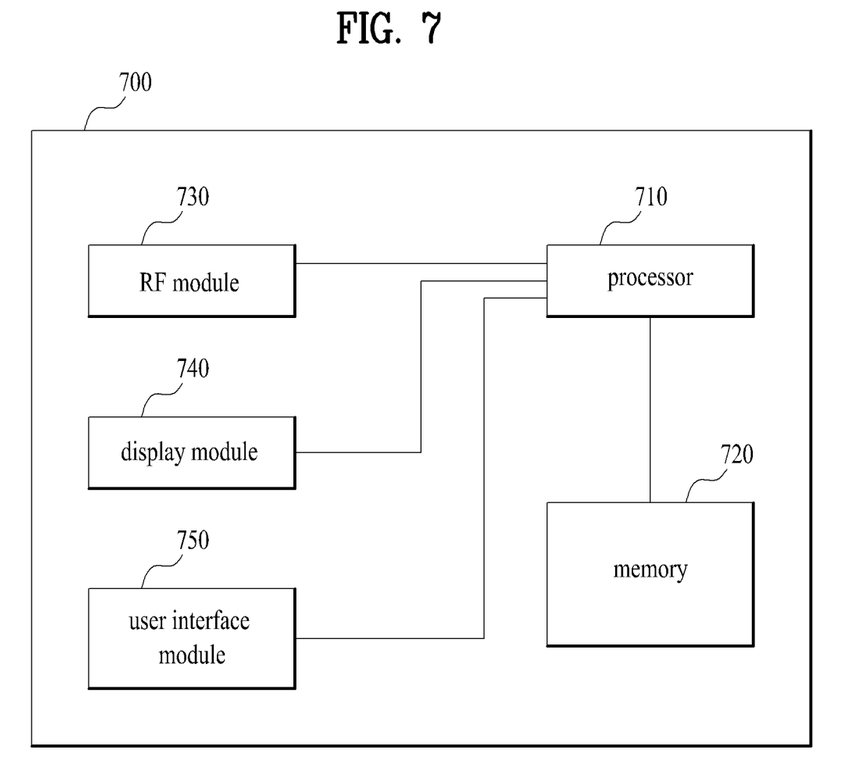
FIG. 7 is a block diagram of an example for a communication transceiver according to one embodiment of the present invention.

FIG. 7 is a block diagram of an example for a communication transceiver according to one embodiment of the present invention. The transceiver may be a part of an eNode B or a part of a user equipment.

Referring to FIG. 7, the transceiver 700 includes a processor 710, a memory 720, an RF module 730, a display module 740, and a user interface module 750.

Since the transceiver 700 is depicted for clarity of description, prescribed module(s) may be omitted in part. The transceiver 700 may further include necessary module(s). And, a prescribed module of the transceiver 700 may be divided into subdivided modules. A processor 710 is configured to perform operations according to embodiments of the present invention described with reference to the drawings.

Specifically, if the transceiver 700 is a part of the eNode B, the processor 710 generates a control signal and can perform a function of mapping the control signal to a control channel, which is configured in a plurality of frequency blocks. And, if the transceiver 700 is a part of the user equipment, the processor 710 checks a control channel indicated to the processor from a signal received from a plurality of the frequency blocks and can extract a control signal from the control channel.

Thereafter, the processor 710 can perform a necessary operation based on the control signal. Detail operations of the processor 710 can refer to the contents described in FIG. 1 to FIG. 6.

The memory 720 is connected with the processor 710 and stores an operating system, applications, program codes, data, and the like. The RF module 730 is connected with the processor 710 and then performs a function of converting a baseband signal to a radio signal or a function of converting a radio signal to a baseband signal. To this end, the RF module 730 performs an analog conversion, amplification, a filtering, and a frequency up conversion, or performs processes inverse to the former processes. The display module 740 is connected with the processor 710 and displays various kinds of informations. And, the display unit 740 can be implemented using such a well-known component as an LCD (liquid crystal display), an LED (light emitting diode), an OLED (organic light emitting diode) display and the like, by which the present invention may be non-limited. The user interface module 750 is connected with the processor 710 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the data transmission/reception relations between a user equipment and an eNode B. In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like. And, a terminal may be substituted with such a terminology as a user equipment (UE), a mobile station (MS), a mobile subscriber station (MSS), and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transmitting IDC information in a wireless communication system and apparatus therefor are described with reference to examples applied to 3GPP LTE system, it may be applicable to various kinds of wireless communication systems as well as the 3GPP LTE system.

What is claimed is:

1. A method of transmitting IDC (In-Device Coexistence) interference information to an eNode B by a first communication module of a user equipment in a wireless communication system, the method comprising:
calculating a transmit power reduction value of the first communication module to avoid interference affecting one or more second communication modules coexisting in the user equipment; and if the calculated power reduction value is greater than a threshold value, transmitting the IDC interference information containing the calculated power reduction value to the eNode B, wherein the IDC interference information comprises information on an interfering frequency where the first communication module affects the one or more second communication modules.

2. The method of claim 1, further comprising reducing the transmit power of the first communication module as much as the threshold value, if the calculated power reduction value is greater than the threshold value,
wherein the IDC interference information comprises a difference value between the calculated power reduction value and the threshold value.

3. The method of claim 1, further comprising reducing the transmit power of the first communication module by the calculated transmit power reduction value, if the calculated transmit power reduction value is less than the threshold value.

4. The method of claim 1, wherein the threshold value corresponds to P-MPR (Power Management-Maximum Power Reduction).

5. The method of claim 1, further comprising receiving information on the threshold value from the eNode B.

6. The method of claim 1, wherein the one or more second communication modules comprise at least one selected from the group consisting of a transceiving module for a WiFi system, a Bluetooth transceiving module, and a GPS (Global Positioning System) receiving module.

7. The method of claim 1, wherein the first communication module is in a state of RRC (Radio Resource Control)$_{13}$ connected with the eNode B.

8. A user equipment in a wireless communication system, the user equipment comprising:
- a first communication module configured to transceive a signal with a first communication system; and
- one or more second communication modules configured to transceive a signal with a different communication system,
- the first communication module configured to calculate a transmit power reduction value of the first communication module to avoid interference affecting the one or more second communication modules coexisting in the user equipment, if the calculated power reduction value is greater than a threshold value, the first communication module configured to transmit the IDC interference information containing the calculated power reduction value to the eNode B, wherein the IDC interference information comprises information on an interfering frequency where the first communication module affects the one or more second communication modules.

9. The user equipment of claim 8, wherein the first communication module is configured to reduce the transmit power of the first communication module as much as the threshold value, if the calculated power reduction value is greater than the threshold value,
wherein the IDC interference information comprises a difference value between the calculated power reduction value and the threshold value.

10. The user equipment of claim 8, wherein the first communication module is configured to reduce the transmit power of the first communication module by the calculated transmit power reduction value, if the calculated transmit power reduction value is less than the threshold value.

11. The user equipment of claim 8, wherein the threshold value corresponds to P-MPR (Power Management-Maximum Power Reduction).

12. The user equipment of claim 8, wherein the first communication module is configured to receive information on the threshold value from the eNode B.

13. The user equipment of claim 8, wherein the one or more second communication modules comprise at least one selected from the group consisting of a transceiving module for a WiFi system, a Bluetooth transceiving module, and a GPS (Global Positioning System) receiving module.

14. The user equipment of claim 8, wherein the first communication module is in a state of RRC (Radio Resource Control)$_{13}$ connected with the eNode B.

* * * * *